United States Patent [19]
Obata et al.

[11] Patent Number: 5,124,165
[45] Date of Patent: Jun. 23, 1992

[54] PROCESS FOR PRODUCING A LONG LIFE TOFU USING SOYBEAN MILK

[75] Inventors: Akio Obata; Masaru Matsuura, both of Noda; Mitsuo Takahashi, Nagareyama; Nobuhiro Horie; Satoru Abe, both of Noda, all of Japan

[73] Assignee: Kikkoman Corporation, Noda, Japan

[21] Appl. No.: 567,894

[22] Filed: Aug. 15, 1990

[30] Foreign Application Priority Data

Aug. 23, 1989 [JP] Japan .................................. 1-214977
Jan. 17, 1990 [JP] Japan ...................................... 2-6457

[51] Int. Cl.$^5$ ................................................ A23B 9/00
[52] U.S. Cl. .................................... 426/399; 426/507; 426/634
[58] Field of Search ................ 426/399, 507, 521, 573, 426/598, 634

[56] References Cited

U.S. PATENT DOCUMENTS

| | | |
|---|---|---|
| 4,000,326 | 12/1976 | Okada et al. |
| 4,140,811 | 2/1979 | Ogasa et al. |
| 4,514,433 | 4/1985 | Matsuura |
| 4,636,398 | 1/1987 | Matsuura .......................... 426/634 |

OTHER PUBLICATIONS

Cheryan, M., Ultrafiltration Handbook, 1986, pp. 27-51, 78, 79, 197-205, 258-263, Techomic Publishing Co., Inc., Lancaster.

Primary Examiner—Donald E. Czaja
Assistant Examiner—Leslie Wong
Attorney, Agent, or Firm—Banner, Birch, McKie & Beckett

[57] ABSTRACT

A process for producing a soybean milk for a long life or a firm long life tofu which comprises removing soluble saccharides from a soybean milk by the use of an ultrafilter membrane giving a fractional molecular weight of 30,000 or above. The soybean milk thus obtained is used for the production of a long life or a firm long life tofu.

5 Claims, 1 Drawing Sheet

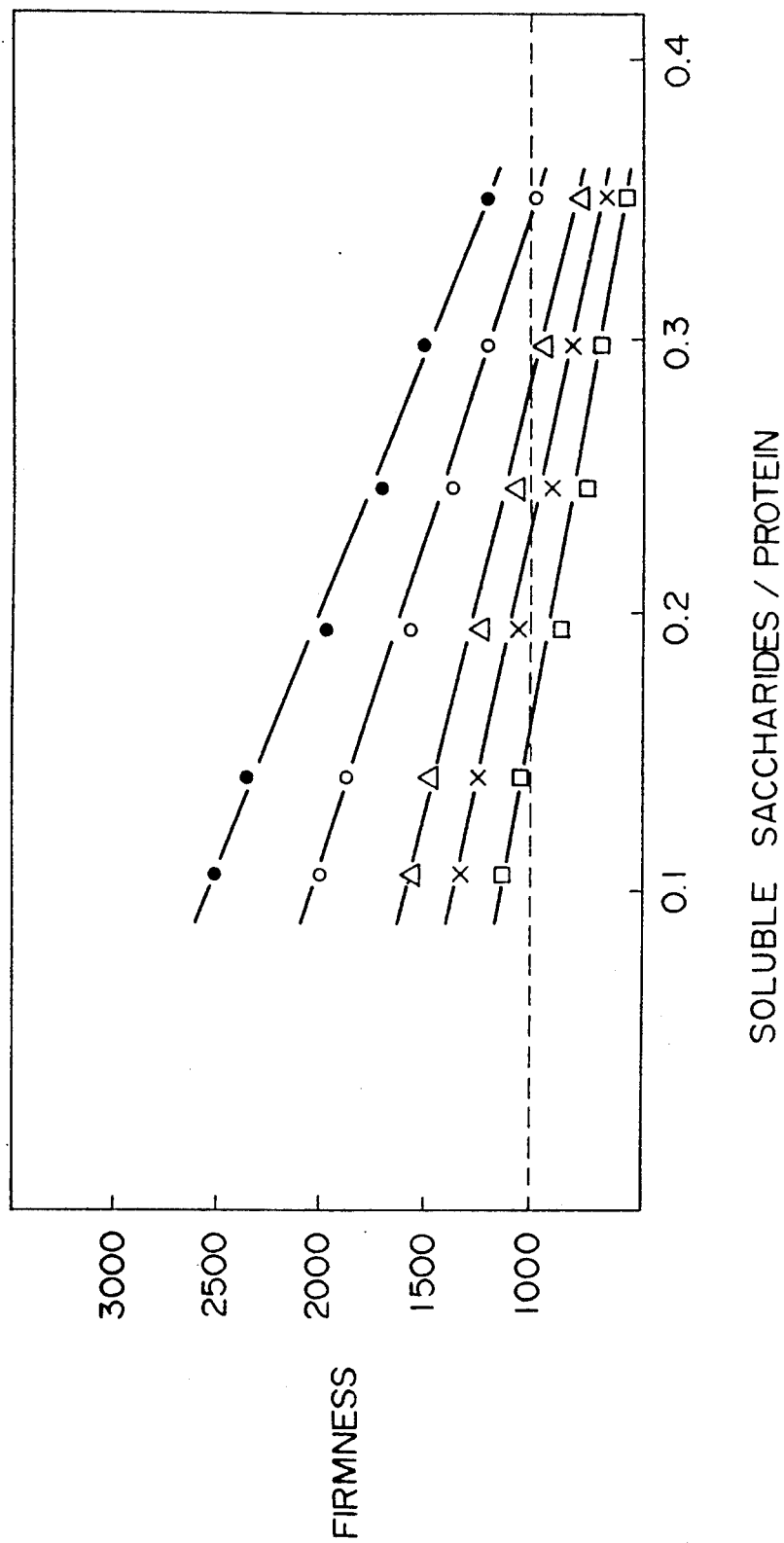

PROCESS FOR PRODUCING A LONG LIFE TOFU USING SOYBEAN MILK

BACKGROUND OF THE INVENTION

1. Field of the Invention

This invention relates to a soybean milk for long life tofu, and to a process for producing a long life tofu by the use of said soybean milk.

2. Description of the Prior Art

Reflecting the current tendency searching for a more improved health, tofu is being watched with a worldwide interest today.

From the viewpoint of commercial circulation, however, tofu has a difficult problem that it is susceptible to microbial pollution and therefore poor in preservability. As methods for solving this problem, long life tofu (hereinafter referred to as "LL tofu") which can be circulated at ordinary temperature, namely retort packed tofu, and aseptic packed tofu have been thought out, and various production processes thereof have been proposed (e.g. U.S. Pat. No. 4,000,326).

Since retort sterilization is a heat treatment under a high temperature-high pressure condition, it is unavoidably accompanied with some undesirable changes due to heating, such as formation of disagreeable odor, browning in color, change in taste, etc. Particularly since tofu is white in color and soft in taste and flavor, these changes exercise an important influence. Thus, retort packed tofu is not easy to produce.

On the other hand, in case of aseptic packed tofu, too, the soybean milk is exposed to high temperature (ca. 130°–150° C.) in the process of sterilization, followed by coagulation step at about 90°–95° C. by adding a coagulant to form an aseptic packed tofu. Thus, formation of disagreeable odor and browning in color unavoidably take place due to heating at a high temperature, similarly to the case of retort sterilization.

Further, LL tofu is stored for a long period of time at ordinary temperature and therefore its browning progresses even in the course of storage. Particularly when container has no oxygen barrier property, this tendency is remarkable and causes deterioration in quality.

The formation of disagreeable odor and browning in color due to heating of tofu are attributable to the soluble saccharides and free amino acids in soybean milk which react upon heating to form brownish materials. Accordingly, these changes due to heating will be preventable by removing these substances from soybean milk. Based on this thought, the present inventors previously established a process for producing LL tofu by removing soluble saccharides from raw soybean and producing LL tofu from a soybean milk prepared from thus treated soybean (U.S. Pat. No. 4,636,398; Japanese Patent Application Kokai (Laid-Open) Nos.60-149354, 61-289851, etc.).

In the above-mentioned process, soluble saccharides are removed by soaking raw soybean in hot water. Thereafter, based on a consideration that removal of soluble saccharides will be similarly achievable also by other methods, the present inventors reached an idea of ultrafiltration.

Ultrafiltration of soybean milk is disclosed in Japanese Patent Application Kokai (Laid-Open) Nos. 49-93557, 52-7466, 59-189986, etc. However, object of these methods consists in removing the disagreeable odor component or concentrating a soybean milk, which differs from the object of the present invention, namely preparation of a soybean milk suitable for producing retort packed tofu by removing soluble saccharides therefrom.

On the other hand, with diversification of dietary life, it is also requested to supply a tofu more firm than ever. As a method for it, addition of isolated soybean protein to soybean milk was proposed (Japanese Patent Application Kokai (Laid-Open) Nos. 58-78559, 62-195262, etc.).

However, addition of isolated soybean protein is disadvantageous in that the protein is difficult to therefrom has a salty taste due to the salt originated from the isolated soybean protein. In addition, this method requires to use an isolated soybean protein having a high gelling ability to endure the condition of sterilization. Apart from the above, in order to increase the protein concentration of soybean milk, it has also been proposed to reduce the quantity of water to be added to starting soybean or to concentrate soybean milk, as methods for preparing firm tofu. However, the former method is low in efficiency because of low recovery rate of protein.

As one example of the latter method, the use of selective permeable membrane for concentrating soybean milk is known. In this method, a reverse osmosis membrane or an ultrafilter membrane giving a relatively low fractional molecular weight (5,000 or below) is used in order to minimize the change in component, so that this is unsatisfactory as a method for producing firm LL tofu.

SUMMARY OF THE INVENTION

Under the above-mentioned situation, the present inventors studied a process for producing a soybean milk suitable for obtaining LL tofu, or a process for producing a soybean milk suitable for obtaining firm LL tofu. As the result, it was found that a soybean milk suitable for producing LL tofu is obtained by removing soluble saccharides from a soybean milk by the use of an ultrafilter membrane giving a fractional molecular weight of 30,000 or above. It was also found that firmness of tofu increases in proportion to removal rate of low molecular weight components expressed by content of soluble saccharides in soybean milk as an index.

The present invention was accomplished on the basis of these findings.

That is, according to the present invention, there are provided a process for producing a soybean milk for a LL or a firm LL tofu which comprises removing soluble saccharides from a soybean milk by the use of an ultrafilter membrane giving a fractional molecular weight of 30,000 or above, and also provided a process for producing a LL or a firm LL tofu using the soybean milk.

BRIEF DESCRIPTION OF THE DRAWING

FIG. 1 is a graph illustrating the relation between firmness and (soluble saccharides)/(protein) ratio at various protein concentrations of soybean milk, wherein protein concentration of soybean milk is as follows:

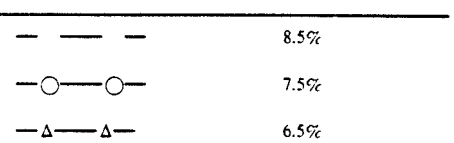

| | |
|---|---|
| —x——x— | 6.0% |
| —□——□— | 5.5% |

DETAILED DESCRIPTION OF THE INVENTION

Now, this invention will be explained below more concretely.

The starting soybean milk used in this invention is not different at all from that used in the conventional production of tofu.

For example, whole soybean is soaked in water for 6 to 20 hours until it is sufficiently swollen, and then it is ground. The resulting slurry is heated at about 90° C. to 120° C. and then filtered to obtain a soybean milk. Otherwise, after filtering the slurry, the filtrate is heated to obtain a soybean milk. Of these two soybean milks, the former is more preferable. According to another allowable embodiment, a raw soybean milk is directly subjected to a membrane treatment at a low temperature.

According to a prior technique, soluble saccharides were removed by soaking, and in this case the use of dehulled soybean was more preferable from the viewpoint of enhancing efficiency of the removal. Contrariwise, whole soybean is satisfactorily usable in this invention, though dehulled one is also usable of course.

Concentration of soybean milk is preferably in the range of 1.5 to 6.5% and particularly 2.0 to 4.5%, as expressed in terms of protein concentration. In this invention, the protein concentration was determined by multiplying total nitrogen content measured by Kjeldahl method by 5.71.

If soybean milk is previously subjected to a homogenizing treatment, efficiency of membrane treatment can be improved. If a heat treatment is carried out at 110° C. to 140° C. for a period of 1 to 120 seconds for the purpose of sterilization, the microbial pollution during the membrane treatment can be prevented.

The starting soybean milk thus obtained is treated with an ultrafilter membrane giving a fractional molecular weight of 30,000 or above to remove soluble saccharides therefrom.

If an ultrafilter membrane giving a fractional molecular weight lower than 30,000 is used, efficiency of filtration is low, as shown later in experimental example. An ultrafilter membrane giving too high a fractional molecular weight is undesirable because it passes protein in soybean milk, too, and thereby reduces utilization rate of starting material. Accordingly, an ultrafilter membrane giving a fractional molecular weight of about 30,000 to 150,000 is preferred.

As the ultrafilter membrane, those made of synthetic polymer type material such as polysulfone, polyolefin, polyacrylonitrile and the like, or those made of ceramic type material such as zirconia ceramic, alumina ceramic and the like are usable. The ultra filter membrane may have a conventional shape, such as flat membrane, hollow yarn, and the like.

Particularly when a soybean milk for retort packed tofu is to be prepared, soluble saccharides must be removed until quantitative ratio (soluble saccharides)/(protein) had reached 0.17 or less. This numerical value corresponds to removal of 45% or more of soluble saccharides in starting soybean. If removal of soluble saccharides is insufficient, disagreeable flavor due to heating and browning occur when retort packed tofu is produced.

The term "soluble saccharides" means water-soluble saccharides which can be eluted into water upon soaking in water or grinding. Total quantity of soluble saccharides can be determined according to the following procedure.

Thus, starting soybean is soaked in a predetermined quantity of water and then ground together with the soaking water. After filtration and washing with water, a mixture of the filtrate and washed water thus obtained is adjusted to pH 4.5 with hydrochloric acid to precipitate the protein. After separating the protein by centrifugation, saccharides concentration in the supernatant is determined by phenol-sulfuric acid method, in terms of quantity of glucose.

The soybean milk of which soluble saccharides content has been reduced in the above-mentioned manner can be satisfactorily used as a soybean milk for LL tofu.

Next, experimental examples of this invention will be presented below.

EXPERIMENTAL EXAMPLE 1

Whole soybeans were soaked in tap water for 16 hours and ground to obtain a slurry. The slurry was heated at 105° C. for 30 seconds and then filtered to obtain a soybean milk having a protein concentration of 5%. The soybean milk was sterilized by heating on plate heater at 125° C. for 10 seconds. Five liters of the starting soybean milk thus obtained was subjected to a treatment by ultrafilter membrane until (soluble saccharides)/(protein) ratio reached 0.16, while adding water thereto. The filter used in this example was TS5E type manufactured by Amicon Co. (diaflow membrane 150 mm $\Phi \times 5$ steps). The ultrafilter membrane was those of YM (polysaccharide type) and XM (vinyl/acryl copolymer type) series manufactured by Amicon Co., and its working conditions were as follows: pressure 1.5 kg/cm$^2$.G, flow rate 50 liters/hour, soybean milk temperature 5° C. The results are shown in Table 1.

TABLE 1

| Ultra-filter membrane | Fractional molecular weight | Mean flow rate of permeation *1 | Necessary time (min.) | Loss in protein content *2 |
|---|---|---|---|---|
| YM-5 | 5,000 | 250 | 20 | 5.0 |
| YM-10 | 10,000 | 400 | 13 | 5.9 |
| YM-30 | 30,000 | 850 | 6 | 6.1 |
| XM-50 | 50,000 | 960 | 5 | 6.0 |
| YM-100 | 100,000 | 1,330 | 4 | 6.0 |
| Xm-300 | 300,000 | 1,410 | 4 | 10.0 |

*1 Mean flow rate of permeation: ml/0.1 m$^2$/hr
*2 Loss in protein content: (Protein content in solution having permeated the membrane/Protein content in starting soybean milk) $\times$ 100

EXPERIMENTAL EXAMPLE 2

Twenty liters of the same soybean milk as used in Experimental Example 1 was treated with Carbosep membrane (zirconia ceramic membrane manufactured by Sumitomo Jukikai Environment Inc.) at a pressure of 2.0 kg/cm$^2$.G, at a flow rate of 420 liters/hour, at a soybean milk temperature of 45° C., while adding water until (soluble saccharides)/(protein) ratio reached 0.16.

The results are shown in Table 2.

TABLE 2

| Ultra-filter membrane | Fractional molecular weight | Mean flow rate of permeation | Necessary time (min.) | Loss in protein content |
| --- | --- | --- | --- | --- |
| M-5 | 20,000 | 330 | 8 | 6.0 |
| M-4 | 50,000 | 660 | 4 | 6.0 |
| M-1 | 150,000 | 870 | 3 | 6.1 |

It is apparent from the above-mentioned experimental examples that an effective removal of saccharides can be achieved by using an ultrafilter membrane giving a fractional molecular weight of 30,000 to 150,000.

In the next place, soybean milk for firm LL tofu will be explained.

In the case of soybean milk for firm LL tofu, too, the soybean milk may be treated just in the same manner as in the above-mentioned case of soybean milk for LL tofu, and treatment using ultrafilter membrane is also just the same as the above, except that in this case the removal of soluble saccharides from soybean milk by the use of ultrafilter membrane must be carried out so that the following equation:

$$Y \leq 0.093X - 0.336$$

is satisfied, wherein X represents a protein concentration (%) in soybean milk, provided that $X \geq 3.61$, and Y represents a ratio of soluble saccharides content to protein concentration, provided that $0 \leq Y \leq 0.35$.

In this invention, firmness of tofu was quantitatively measured by cutting out a 17 mm cube from tofu sample, depressing it by a length of 12 mm by the use of a circular plunger having a diameter of 40 mm, and measuring the work done from contact of plunger with tofu to the breakage of tofu by the use of Tensipressor (manufactured by Taketomo Denki Co.). Firmness was expressed by the reading of integrator.

The value of firmness thus measured was 350 to 550 in commercial silken tofu and 450 to 650 in commercial momen tofu. A clear difference from commercial tofu in firmness was noticeable only when this value was 1,000 or above. Accordingly, in this invention, it was aimed at that this value exceeded 1,000.

Next, an experimental example will be further presented.

EXPERIMENTAL EXAMPLE 3

Twenty liters of a starting soybean milk prepared in the usual manner was treated with Carbosep membrane M-1 (zirconia ceramic membrane manufactured by Sumitomo Jukikai Environment Inc.) at a pressure of 2.0 kg/cm$^2$.G at a flow rate of 420 liters/hour at a soybean milk temperature of 45° C. while adding water thereto, until protein concentration reached 9.0% and (soluble saccharides)/(protein) ratio reached 0.11.

Then, water was added to the concentrate, or the filtrate obtained at the time of concentration was added to the concentrate, or a concentrated filtrate was added thereto, to prepare a soybean milk having a regulated protein concentration of 5.5 to 8.5% and a regulated (soluble saccharides)/(protein) ratio of 0.11 to 0.35. Then, glucono-delta-lactone (GDL) was added and the resulting mixture was packed into retort container and then sterilized at a pressure of 2 kg/cm$^2$G and at 120° C for 50 minutes to obtain a retort tofu. Each of the tofus thus obtained was examined for firmness by means of Tensipressor to obtain the results shown in FIG. 1.

It is apparent from FIG. 1 that firmness linearly increases as (soluble saccharides)/(protein) ratio decreases.

Further, it is apparent that (soluble saccharides)/(protein) ratio giving a firmness exceeding 1,000 varies with protein concentration. The relation between X (protein concentration %) and Y [lowest ratio of (soluble saccharides)/(protein)] capable of giving a firmness exceeding 1,000, read out from FIG. 1, is as shown in Table 3.

TABLE 3

| X | Y |
| --- | --- |
| 7.5 | 0.35 |
| 6.5 | 0.28 |
| 6.0 | 0.23 |
| 5.5 | 0.16 |

In Table 3, X and Y are in a linear relation, and they give the following regression formula:

$$Y = 0.093X - 0.336$$

provided that correlation coefficient is 0.9855.

That is to say, when X and Y satisfy the following formula:

$$Y \leq 0.093X - 0.336$$

the object of this invention is achieved, wherein Y is smaller than 0.35 (soybean milk is not subjected to removal of saccharides) and greater than O and X is 3.61 or above (this means that, even if saccharides are removed to an extent of 100%, firmness cannot reach 1,000 if protein concentration is 3.61 or below).

Further, it is known that, when X is 7.38% or above, Y is 0.35 or above, and a tofu having a firmness of 1,000 or above can be obtained by a mere concentration without removal of saccharides. However, soybean milks having a protein concentration of 7.38% or above and not yet subjected to removal of saccharides are poor in workability because of rise in viscosity. Accordingly, it is desirable to carry out the treatment so that X and Y satisfy the following formulas:

$$0.25 \geq Y \geq 0.05$$

$$8.5 \geq X \geq 5.0$$

As has been mentioned in detail above, a firm tofu excellent in flavor and taste is obtained by treating a soybean milk with an ultrafilter membrane giving a fractional molecular weight of 30,000 or above so that X (protein concentration) and Y [(soluble saccharides)/(protein) ratio] satisfy the formula $Y \geq 0.093X - 0.336$, followed by a aseptic packing or a retort treatment.

Tofu can be produced from these soybean milks in the following manner. Thus, in case of retort packed tofu, coagulants are mixed into a soybean milk and the mixture is sealed into a heat resistant retort container such as gazette pouch prepared by, for example, polypropylene laminated with aluminum, and then treated at a high pressure (e.g. 2 kg/cm$^2$G), at a high temperature (e.g. 120° C.) for 50 minutes. In case of aseptic packed tofu, a soybean milk having been treated with ultrafilter membrane is sterilized by heating it at high temperature (130° to 150° C.) for a short period of time (2 to 8 seconds), after which a sterilized coagulant is mixed thereinto, and the resulting mixture is packed and sealed into a sterilized container in an aseptic atmosphere and then coagulated with heating.

As has been mentioned above, according to this invention, a soybean milk suitable for LL tofu can be obtained by treating a soybean milk with an ultrafilter membrane giving a fractional molecular weight of 30,000 or above and thereby removing soluble saccharides from the soybean milk.

Next, examples of this invention will be mentioned.

EXAMPLE 1

Whole soybeans were soaked in tap water for 16 hours and then the swollen soybean were ground while adding 8 times their quantity of water by volume to form a slurry. The raw slurry thus obtained was heated at 105° C. for 30 seconds and then filtered by means of a screw decanter to obtain a soybean milk. The soybean milk had a protein concentration of 3.8% and a soluble saccharides content of 1.2%. By means of Carbosep 2SV7C testing machine (manufactured by Sumitomo Jukikai Environment Inc.), the soybean milk was treated at a pressure of 4 kg/cm$^2$.G, at a temperature of 50° C., at a flow rate of 500 liters/hour, while adding water. Thus, the soybean milk having a soluble saccharides content of 0.63% and a protein concentration of 4.8% was obtained. This soybean milk had a (soluble saccharides)/(protein) ratio of 0.13.

Production of Retort Tofu

The soybean milk obtained above was homogenized with a high pressure homogenizer, and then deaerated. After heating the soybean milk at 120° C. for 3 seconds, it was cooled and an aqueous solution of GDL as a coagulant was added in a portion of 0.3% by volume of soybean milk. The mixture was introduced into a gazette pouch prepared by polypropylene laminated with aluminum and tightly sealed, after which it was heat-treated at a pressure of 2 kg/cm$^2$.G and at 120° C. for 50 minutes to obtain a retort tofu.

On the other hand, according to the procedure mentioned in Japanese Patent Application Kokai No. 60-149354, dehulled soybeans were soaked in water at 50° C. for 2 hours to remove 60% of the soluble saccharides. Using the soybeans thus prepared as starting material, a soybean milk having a protein concentration of 4.7% and a soluble saccharides content of 0.66% [that is, (soluble saccharides)/(protein) ratio =0.14] was prepared. After homogenizing the soybean milk by means of a high pressure homogenizer and deaerating it, it was treated in the same manner as above to obtain a retort tofu.

Both the retort tofus thus obtained were not different from each other in color, flavor and taste.

EXAMPLE 2

Whole soybeans were soaked in tap water for 16 hours and then the swollen soybeans were ground while adding 8 times their quantity of water by volume to form a slurry. The slurry thus obtained was heated at 105° C. for 30 seconds and then filtered by means of screw decanter to obtain a soybean milk. This soybean milk had a protein concentration of 3.8% and a soluble saccharides content of 1.35%. After concentrating the soybean milk by means of Carbosep 2SV7C testing machine (manufactured by Sumitomo Jukikai Environment Inc.) at a pressure of 4 kg/cm$^2$.G, at a temperature of 50° C., at a flow rate of 500 liters/hour, low molecular weight components were removed while adding distilled water to obtain a soybean milk having a soluble saccharides content of 0.82% and a protein concentration of 7.0%. The (soluble saccharides)/(protein) ratio of this soybean milk was 0.117, and the condition $Y \leq 0.32$ was satisfied.

After homogenizing the soybean milk with a high pressure homogenizer and deaerating it, it was immediately cooled and stored. To the soybean milk was added GDL as a coagulant in an amount of 0.35%, and the resulting mixture was introduced into a gasette pouch prepared by polypropylene laminated with aluminum and tightly sealed. Then, the sealed tofu was treated at a pressure of 2 kg/cm$^2$.G and at 120° C. for 50 minutes to obtain a retort tofu.

Firmness of this tofu was 1670 as measured with Tensipressor, and the tofu was excellent in taste and flavor without browning of color.

EXAMPLE 3

Dehulled soybeans soaked in water at 50° C. for 2 hours were used as starting material, from which a soybean milk was prepared in the same manner as in Example 1. The soybean milk had a protein concentration of 5.36% and a soluble saccharides content of 0.75%. After deaerating the soybean milk, it was introduced into Carbosep and concentrated to obtain a soybean milk having a protein concentration of 7.15% and a soluble saccharides content of 0.75% [(soluble saccharides)/ (protein) ratio =0.10]. The soybean milk was sterilized at 140° C. for 3 seconds by means of steam direct heating type sterilizer, after which it was cooled to 50° C., homogenized in a high pressure homogenizer under an aseptic condition, cooled to 7° C. and stored in a sterile tank. The soybean milk thus obtained satisfied $Y \leq 0.33$. Thereinto was aseptically mixed an aqueous solution of GDL having been sterilized by the use of membrane filter in a proportion of 0.35% by volume of soybean milk. The resulting mixture was packed into a container having previously been sterilized with hydrogen peroxide in an aseptic atmosphere and tightly sealed, after which it was dipped in hot water at 90° C. for 60 minutes for the sake of coagulation, whereby an aseptic packed tofu was obtained.

The tofu thus obtained had a firmness of 1720 as measured with Tensipressor. After storage at 30° C. for 6 months, it showed no noticeable change, and it was a firm tofu excellent in taste and flavor.

What is claimed is:

1. A process for producing a firm aseptic tofu which comprises removing soluble saccharides from a soybean milk by the user of an ultrafilter membrane giving a fractional molecular weight of 30,000 or above so that X and Y satisfy the following formula:

$$Y \leq 0.093X - 0.336$$

wherein X represents protein concentration (%) in soybean milk, provided that $X \geq 3.61$, and Y represents ratio of soluble saccharides content to protein concentration, provided that $0 \leq Y \leq 0.35$, followed by subjecting the soybean milk thus obtained to a sterilizing treatment at 130° C. to 150° C. for a period of 2 to 8 seconds, adding and mixing a coagulant having been sterilized by means of membrane filter into the soybean milk, packing the resulting mixture into a previously sterilized container in an aseptic atmosphere, and then coagulating the soybean milk with heating in hot water.

2. A process according to claim 1, wherein the following formulas:

$$5.0 \leq X \leq 8.5$$

and $$0.05 \leq Y \leq 0.25$$

are satisfied.

3. A process according to claim 1, wherein the ultrafilter membrane is that giving a fractional molecular weight of 30,000 to 150,000.

4. A process according to claim 1, wherein the ultrafilter membrane is that made of polysulfone, polyolefin, polyacrylonitrile, alumina ceramic or zirconia ceramic.

5. A process according to claim 1, wherein the ultrafilter membrane is in the shape of flat or hollow yarn.

* * * * *